United States Patent

Harmuth

[15] 3,668,639

[45] June 6, 1972

[54] SEQUENCY FILTERS BASED ON WALSH FUNCTIONS FOR SIGNALS WITH THREE SPACE VARIABLES

[72] Inventor: Henning Friedolf Harmuth, Bethesda, Md.

[73] Assignee: International Telephone and Telegraph Corporation, Nutley, N.J.

[22] Filed: May 7, 1971

[21] Appl. No.: 141,328

[52] U.S. Cl. ..................340/166 R, 178/5.4 MA, 178/7.3 D, 340/339

[51] Int. Cl. ..........................................................H04q 9/00

[58] Field of Search ............340/166, 324, 339; 178/5.4 MA, 178/7.3 D

[56] References Cited

OTHER PUBLICATIONS

IEEE Transaction on Information Theory Vol. IT- 14, No. 3 May 1968 pages 375- 382, " A Generalized Concept of Frequency and Some Applications" Hening F. Harmuth IEEE Transaction on Instrumentations and Measurement Vol. 1M- 18 No. 4, December 1969, Pg. 316- 321, " Digital Walsh Fourier Analysis of Periodic Waves," Karl Hans Siemans et al.

*Primary Examiner*—Donald J. Yusko

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

A sequency sampling filter based on Walsh Functions for signals having three space variables, *x*, *y* and *z*. Voltages derived from the space domain are transformed into voltages in a sequency domain. The filtering process is performed by not feeding certain voltages *a* (*k*,*m*,*n*) to a circuit which performs the inverse transformation of voltages in the sequency domain back into the space domain.

3 Claims, 13 Drawing Figures

Fig. 1
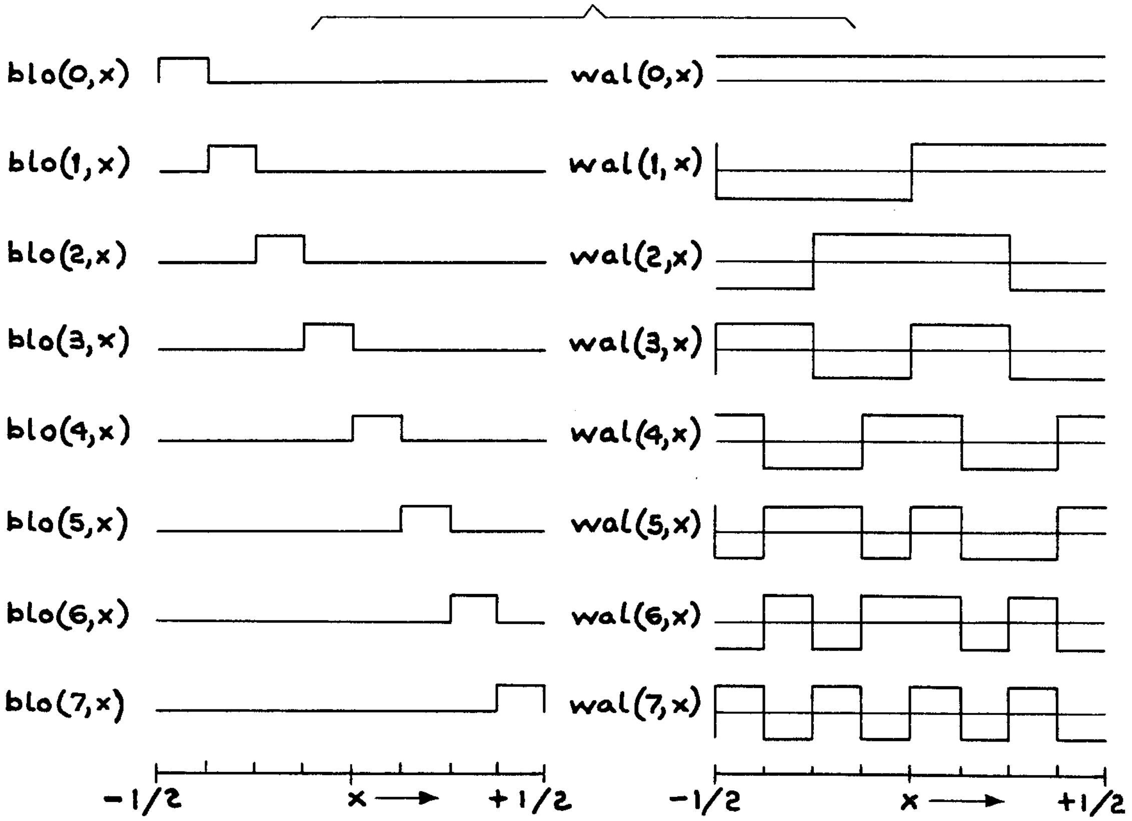
Fig. 5a Fig. 5b
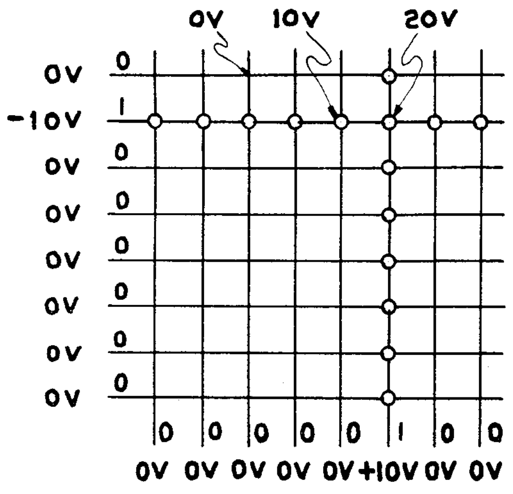
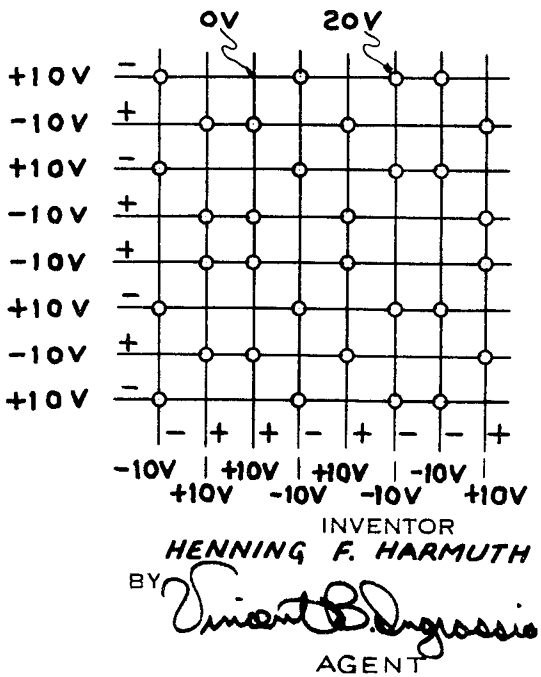
INVENTOR
HENNING F. HARMUTH
BY Vincent B. Ingrassia
AGENT INVENTOR
HENNING F. HARMUTH
BY Vincent B. Ingrassia
AGENT INVENTOR
HENNING F. HARMUTH
BY [signature]
AGENT INVENTOR
HENNING F. HARMUTH
BY Vincent B. Ingrassia
AGENT INVENTOR
HENNING F. HARMUTH
BY Vincent B. Ingrassia
AGENT

SEQUENCY FILTERS BASED ON WALSH FUNCTIONS FOR SIGNALS WITH THREE SPACE VARIABLES

CROSS-REFERENCES TO RELATED APPLICATIONS

This invention is related to U.S. Pat. application Ser. No. 77,996 entitled "Sequency Filters Based on Walsh Functions for Signals with Two Space Variables" by H.F. Harmuth, filed Oct. 5, 1970, and assigned to the assignee of the present invention.

BACKGROUND OF THE INVENTION

The present invention relates to filters for signals having three space variables.

The above-identified related case describes the use of the crossbar sampling principle in conjunction with Walsh functions. The results obtained for two spaced variables are extended in this application to three space variables. Previously, the emphasis has been on sampling and filtering since a cathode ray tube for example is a good display means for signals with two space variables. The extension to three space variables emphasizes the use of the crossbar principle and Walsh functions for three dimensional displays. There is, however, little difficulty in applying the results to the sampling and filtering of signals with three space variables.

SUMMARY OF THE INVENTION

It is an object of the present invention to provide a three dimensional filter based on Walsh functions for a signal having three space variables $x$, $y$ and $z$.

According to a broad aspect of the invention there is provided an apparatus for displaying three-dimensional Walsh functions by light emission comprising a three-dimensional crossbar matrix comprising a first plurality of wires parallel to the $x$-axis of a three-dimensional coordinate system, a second plurality of wires parallel to the $y$-axis of said coordinate system, a third plurality of wires parallel to the $z$ direction of said coordinate system, the intersection of said first, second and third plurality of wires forming crosspoints, a first Walsh function generator coupled to said first plurality of wires, a second Walsh function generator coupled to said second plurality of wires, a third Walsh function generator coupled to said third plurality of wires, and light emitting means coupled to each of said crosspoints for emitting light when the product of the Walsh functions applied to each of said crosspoints by said first, second and third Walsh function generators represent a positive voltage.

The above and other objects of the present invention will be more clearly understood from the following description taken in conjunction with the accompanying drawings, in which:

BRIEF DESCRIPTION OF THE DRAWINGS

FIG. 1 shows block pulses blo($k$,$x$) and Walsh functions wal($k$,$x$) for $k$=0 . . . 7;

FIG. 4$b$ shows sampling by Walsh functions in two space dimensions using the crossbar principle;

FIG. 5$a$ shows the voltage difference in a two-dimensional crossbar sampler operated according to block pulses;

FIG. 5$b$ shows the voltage difference in a two-dimensional crossbar sampler operated according to Walsh functions;

DESCRIPTION OF THE PREFERRED EMBODIMENT

FIG. 1 defines the notation blo($k$,$x$) for block pulses and wal($k$,$x$) for Walsh functions. Block pulses in two and three space dimensions are defined by the products blo($k$,$x$) blo($m$,$y$) and blo($k$,$x$) blo($m$,$y$) blo($n$,$z$) respectively. Similarly, Walsh functions are defined by wal($k$,$x$) wal($m$,$y$) for two space dimensions and by wal($k$,$x$)x wal($m$,$y$) wal($n$,$z$) for three dimensions.

Figure 2:
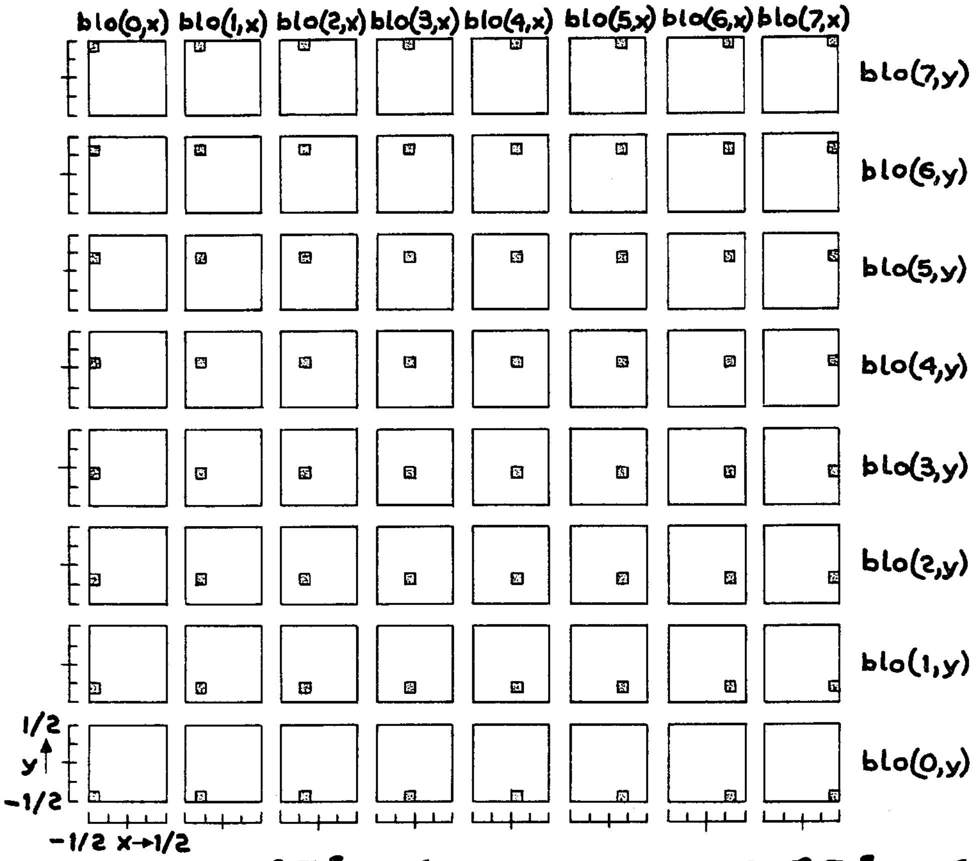
FIG. 2 shows block pulses blo($k$,$x$) blo($m$,$y$) for $k$,$m$=0 . . . 7.

FIG. 2 shows block pulses with two variables in the interval $-\frac{1}{2} \leq x < \frac{1}{2}$, and $-\frac{1}{2} \leq y < \frac{1}{2}$ for $k$,$m$=0 . . . 7. The functions blo($k$,$x$)x blo($m$,$y$) is found at the intersection of the column denoted blo($k$,$x$) and the row denoted blo($m$,$y$). Black areas represent the value +1, and white areas the value 0. The black areas move from left to right as $k$ increases and from bottom to top as $m$ increases. This corresponds to the movement of the illuminated spot on a TV tube that is scanned from left to right and from bottom to top.

Figure 3:
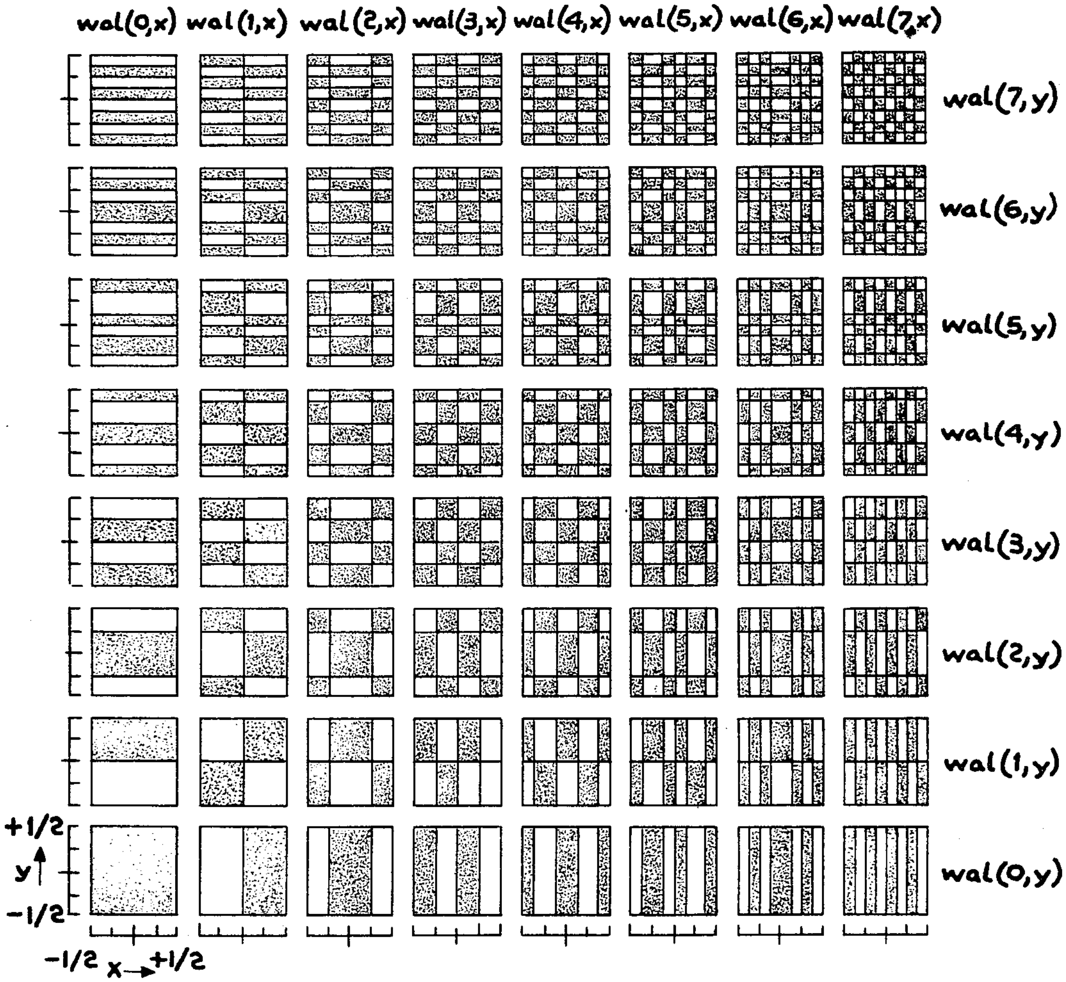
FIG. 3 shows Walsh functions wal($k$,$x$) wal($m$,$y$) for $k$,$m$=0 . . . 7.

FIG. 3 shows Walsh functions with two variables in the interval $-\frac{1}{2} \leq x < \frac{1}{2}$ $-\frac{1}{2} \leq y < \frac{1}{2}$ for $k$, $m$ = 0 . . . 7. As before, the function wal($k$,$x$) wal($m$,$y$) is located at the intersection of the column denoted wal($k$,$x$) and the row denoted wal($n$,$y$). The black areas again represent the value +1 but the white areas now represent the value −1.

Figures 4A, 4B:
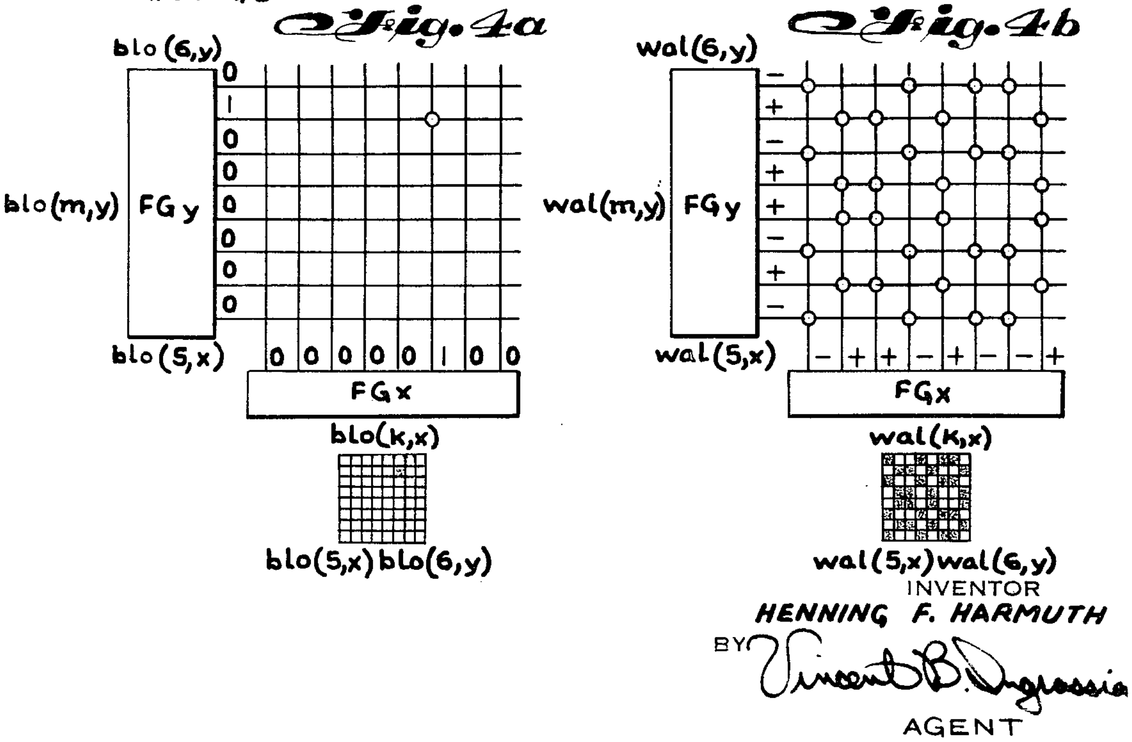
FIG. 4$a$ shows sampling by block pulses in two space dimensions using the crossbar principle.

FIG. 4$a$ shows the principle of the crossbar scanner in two dimensions operated according to block pulses. The function generator FG$x$ produces the function blo(5,$x$) which is represented by a voltage 0 at all vertical bars except bar 6 to which the voltage 1 is applied. Similarly, the generator FG$y$ produces the function blo(6,$y$) which is represented by a voltage 0 at all horizontal bars except bar 7, to which the voltage 1 is applied. The crossing of the two bars having a voltage 1 is indicated by a black dot. This dot represents the function blo(5,$x$) blo(6,$y$).

Referring to FIG. 4$b$, the function wal(5,$x$) is represented by positive and negative voltages applied to the vertical bars as supplied by the function generator FG$x$, while the generator FG$y$ supplies the function wal(6,$y$) to the horizontal bars. The crossings of bars with equal applied voltages are indicated by black dots. One may readily see that this dot pattern corresponds to the black area of the function wal(5,$x$)x wal(6,$y$). The white area corresponds to the crossings where a voltage difference exists.

Referring to FIG. 5$a$, the voltage +10V is substituted for the voltage "1" at the vertical bars and the voltage −10V at the horizontal bars. The voltage difference 20V is obtained at the crossing of the bars to which +10V and −10V are applied. Most other crossings have a voltage difference OV but there are a few with a difference 10V.

Considering now FIG. 5b, the voltages +10V and −10V are substituted for + and − at the vertical bars, but the reversed signs are again used for the horizontal bars. The voltage difference at the crossings are all either 20V or 0V; and there are no intermediate voltages as in the case of block pulse sampling.

The crossbar principle is presently the most likely one to be used if the flat TV screen should be practical. Let us assume such a screen emits light at the crossings with a sufficiently high voltage difference. The intensity of the light could be modulated for block pulse sampling as well as for Walsh function sampling by varying the length of time during which the voltages are applied to the crossbars. The absence of intermediate voltage differences in the case of Walsh function sampling is advantageous. A further advantage is the brightness of the resulting image.

The improved brightness is the major advantage of Walsh functions in a three dimensional display. Consider a TV image with 512 × 512 picture elements and a screen that emits light only as long as a voltage is applied. Only one point would emit light at any time if block pulse sampling were used, but $(512)^2/$ pling were used. Furthermore, the largest permissible voltage difference would only be twice the lowest voltage difference that results in light emission in the block pulse case, while the voltage difference is limited by practical considerations only for Walsh functions. This effects not only the brightness but also the dynamic range of amplitude modulation which must be less than 2:1 for block pulses but is unlimited for Walsh functions.

The improved brightness just described assumes a screen that emits light only as long as a voltage is supplied. However, the results also apply to screens with persistance. The energy of the light emitter cannot be larger than the energy supplied by the voltage difference, regardless how short or long the persistance of the screen is. The average time during which a voltage difference exists is the same for sampling according to block pulses or Walsh functions. The permissible voltage difference is much larger for Walsh functions and the number of points to which energy is supplied is $(512)^2/2$ times larger for Walsh functions.

Considering again a TV screen with 512 × 512 picture elements, displaying 30 images per second requires the illumination of 30 × $(512)^2$= 7,864,320 points per second on the screen. This allows 127 nanoseconds for the transfer of energy to each point. The cathode ray tube is capable of supplying the required energy in such a short time by using a sufficiently high accelerating voltage for the electrons, but the principle of the cathode ray tube is difficult to extend to three-dimensional displays.

Consider a three-dimensional display of TV picture quality. There are now $512^3$ picture elements and energy has to be transferred to 30 × $512^3$ = 4,026,531,840 points per second. Using block pulse sampling, 248 picoseconds are available for the energy transfer to each point. Using Walsh function sampling, one transfers energy simultaneously to $(512)^3/2$ = 67,108,864, which increases the brightness by essentially this factor. Furthermore, the higher permissible voltage discussed previously for a two dimensional display carries over to three dimensional displays.

So far, nothing has been said about how a voltage difference between two crossbars is transformed into visible light. The classical means are glow tubes which will emit light independently of the direction of current flow. The principle is to use the voltage difference to lift electrons to higher energy levels from which they drop emitting the energy difference as light. A variety of semiconductors can be used instead of glow tubes.

Figures 6, 7:
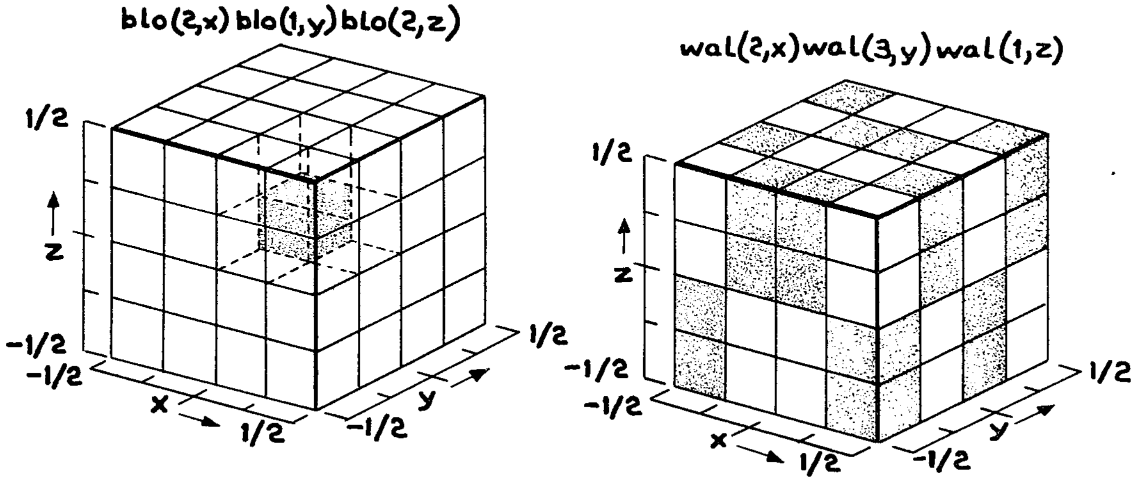
FIG. 6; 6$a$ illustrate the three-dimensional block pulses blo(2, $x$) blo(1, $y$) blo(2, $z$)
FIG. 7; 7$a$ show the three-dimensional Walsh function wal(2,$x$) wal(3,$y$) and wal(1,$z$)
Figure 6A:
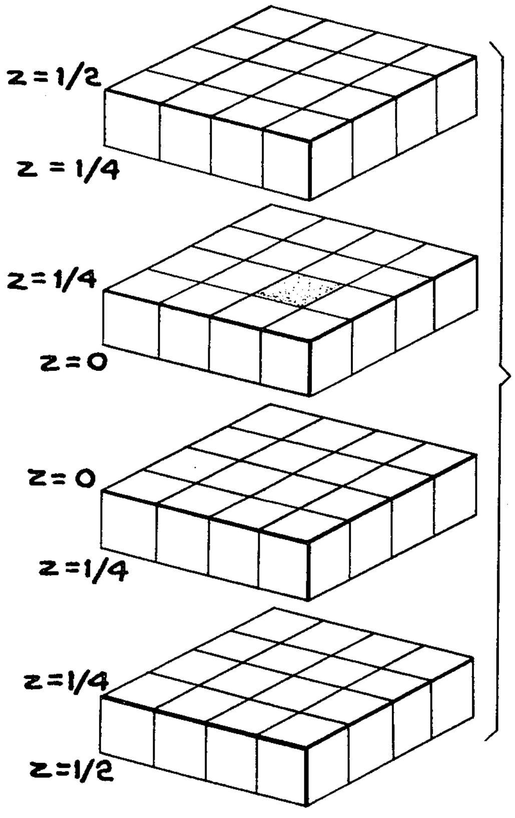
Figure 7D:
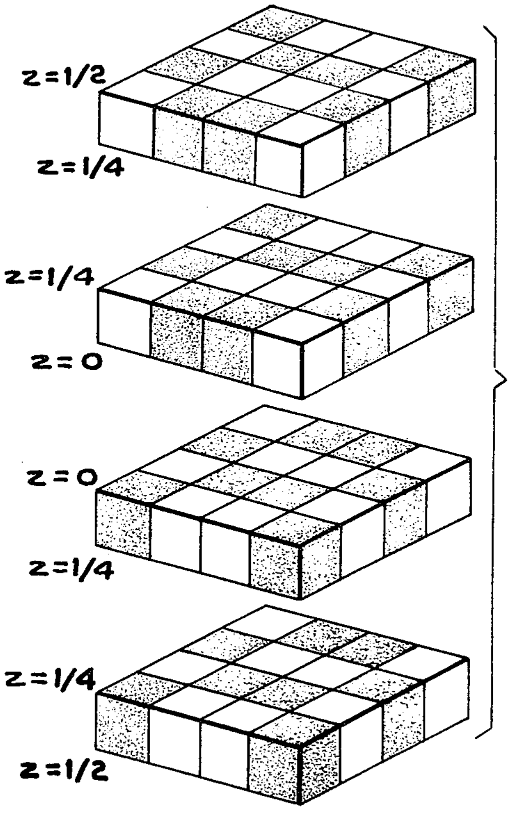

FIG. 6 shows a three-dimensional block pulse and FIG. 7 a three-dimensional Walsh function in the interval $-½ \leq x<½$, $-½ \leq y <½$, $-½ \leq z <½$. A function $F(x,y,z)$ is represented by Walsh functions as follows:

$$F(x,y,z)=\sum_{k=0}^{\infty}\sum_{m=0}^{\infty}\sum_{n=0}^{\infty} a(k,m,n)wal(k,x)wal(m,y)wal(n,z)$$

$$a(k,m,n)=\int_{-1/2}^{1/2}\int_{-1/2}^{1/2}\int_{-1/2}^{1/2} F(x,y,z)wal(k,x)wal(m,y)wal(n,z)dxdydz \quad (1)$$

The three-dimensional display according to Walsh functions requires a cubic pattern of light emitting devices such as glow tubes. For instance, a glow tube has to be placed at the center of each one of the 64 cubes of the function wal(2,x) wal(3,y) wal(1,z) of FIG. 7. The glow tubes replacing the 32 black cubes emit light. The multiplications by coefficients $a(2,3,1)$ or, more generally $a(k,m,n)$, can be accomplished by changing the intensity of the emitted light or the length of time during which light is emitted; the first case representing amplitude modulation and the second case time modulation.

For a display of TB quality, the coefficients k,m,n in equation (1) have to assume values from 0 to 511. If the $512^3$ resulting Walsh functions are amplitude or time modulated proportional to the coefficients $a(k,m,n)$, and if this process is repeated 30 times per second one obtains a three-dimensional image of TV picture quality.

Figure 8:
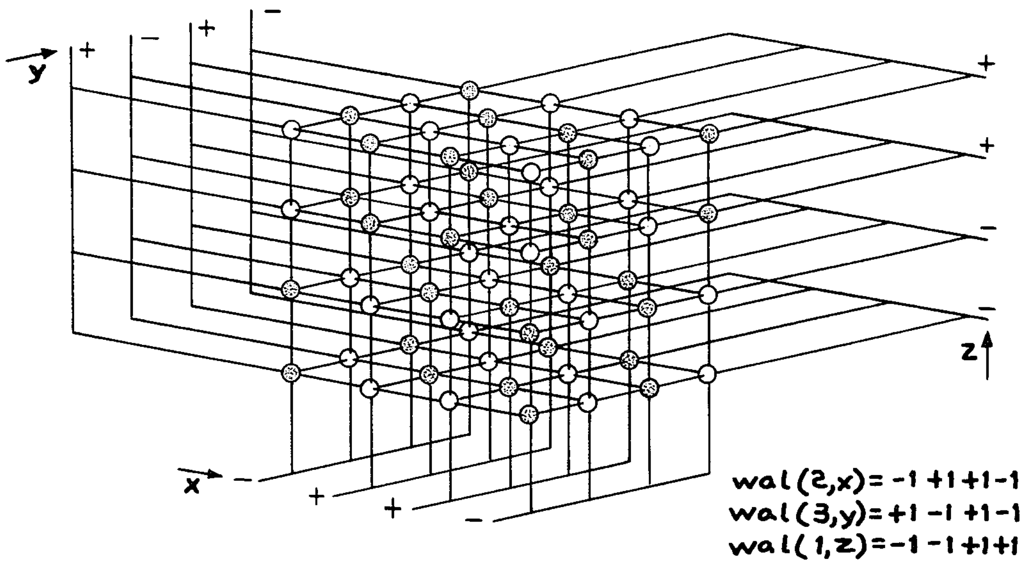
FIG. 8 illustrates a three-dimensional display of the Walsh function of FIG. 7.

FIG. 8 shows the extension of the crossbar principle of FIG. 4 to three dimensions. The bars have to be replaced by planes, and the bar crossings by the intersection points of three perpendicular planes. The "planes" are represented in FIG. 8 by parallel bars or wires. Each one of the four inputs in the x, y and z direction denoted by plus or minus is connected to four bars which are located in the plane. The inputs in the x direction feed bars in a plane perpendicular to the x-axis, the inputs in the y direction to bars in a plane perpendicular to the y-axis and the inputs in the z direction to bars in a plane perpendicular to the z-axis. The black spheres in FIG. 8 are located as are the black cubes in FIG. 7. They represent the value +1 of the function wal(k,x) wal(m,y) wal(n,z). The white spheres represent the value −1.

Figure 9:
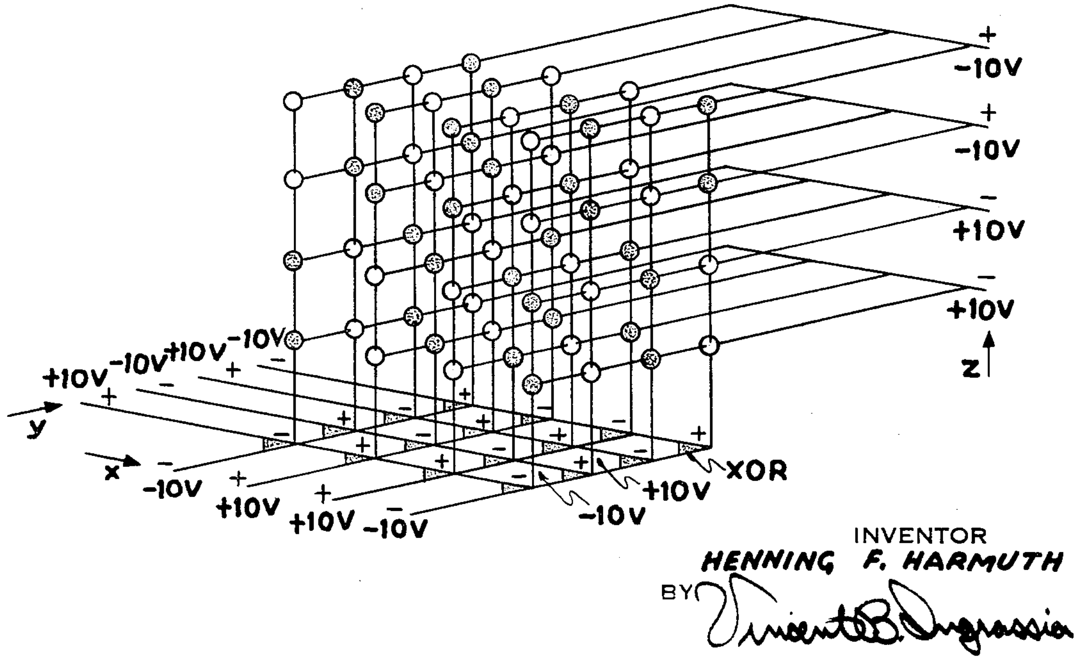
FIG. 9 illustrates the principle of a practical display device according to FIG. 8.

FIG. 9 shows how the principle shown by FIG. 8 can be made into a practical circuit. In FIG. 9 the inputs in the x and y direction are fed to exclusive OR gates XOR located at each crossing of the input bars and shown as black triangles. The outputs of these gates feed the vertical bars. If a voltage +10V is fed to each x and y input denoted by plus, and the voltage −10V to each x and y input denoted by minus, then the voltages +10V or −10V will be applied to the vertical bars as shown.

The z inputs are fed with reversed sign. The voltage +10V is fed to inputs denoted minus and the voltage −10V to inputs denoted plus. The black spheres in FIG. 9 are located at bar crossings with a voltage difference of 20V while the white spheres are at crossings with no voltage difference. Substituting glow tubes or other voltage-difference-to-light-converters for the spheres yields a practical circuit that represents three-dimensional Walsh functions by light emission where the function is +1 and no light emission where the function is −1. The generation of the voltages representing wal(k,x) wal(m,y) wal(n,z) was discussed in the above cross referenced application and need not be repeated. Three function generators are required for a three-dimensional display.

The spheres or voltage-difference-to-light-converters in FIG. 9 are arranged like a stack of printed circuit cards that have connectors at the bottom or the rear edge.

Figure 10:
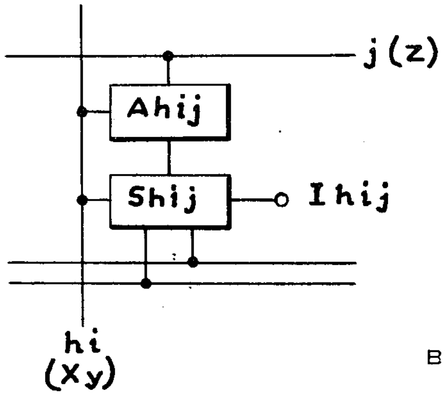
FIG. 10 shows a device for the conversion of the circuit of FIG. 9 into a three-dimensional sampler.

In FIG. 10 the voltage-difference-to-light-converters of FIG. 9 are replaced by exclusive OR gates and a single-pole, double-throw switch. The photo-electrical device is connected to the input Ihij of the switch, if a three-dimensional optical signal is to be sampled, or a thermo-electric device for a temperature sampler, or a microphone for an acoustic sampler, etc. The outputs of all switches, which would be a total of $512^3$ for TV resolution are connected in parallel and fed to a summing amplifier having a positive and negative input. The output of the summing amplifier represents the coefficient $a(k,m,nk,x)$, wal(m,y) and wal(n,z) are applied to the inputs of FIG. 9.

This three-dimensional sampling device is converted into a sampling filter by simply not sampling certain coefficients $a(k,m,n)$. The possible variations of filters in three dimensions greatly exceed that of two dimensions, and there is not particular difficulty in the extension of the results previously obtained for two-dimensional sampling filters to three dimensions.

It is to be understood that the foregoing description of specific examples of this invention is made by way of example only and is not to be considered as a limitation on its scope.

I claim:

1. An apparatus for displaying three-dimensional Walsh functions by light emission comprising:

a three-dimensional crossbar matrix comprising a first plurality of wires parallel to the x-axis of a three-dimensional coordinate system;

a second plurality of wires parallel to the y-axis of said coordinate system;

a third plurality of wires parallel to the z direction of said coordinate system, the intersection of said first, second and third plurality of wires forming crosspoints;

a first Walsh function generator coupled to said first plurality of wires;

a second Walsh function generator coupled to said second plurality of wires;

a third Walsh function generator coupled to said third plurality of wires; and light emitting means coupled to each of said crosspoints for emitting light when the product of the Walsh functions applied to each of said crosspoints by said first, second and third Walsh function generators represent a positive voltage.

2. An apparatus according to claim 1 wherein exclusive OR gates are coupled to the crossing of said first and second plurality of wires.

3. An apparatus according to claim 1 wherein an exclusive OR gate and a single-pole double-throw switch is coupled to each of said crosspoints further comprising a summing amplifier to which are fed in parallel the outputs of said switches, the output of said summing amplifier representing the Walsh-Fourier transform of the applied signal.

* * * * *